(12) United States Patent
Op De Beeck et al.

(10) Patent No.: US 12,011,701 B2
(45) Date of Patent: Jun. 18, 2024

(54) CHEMICAL REACTORS

(71) Applicant: PHARMAFLUIDICS NV, Ghent (BE)

(72) Inventors: Jeff Op De Beeck, Mariakerke (BE); Bo Claerebout, Kortrijk (BE); Wim De Malsche, Berchem (BE); Paul Jacobs, Lokeren (BE)

(73) Assignee: PharmaFluidics NV, Ghent (BE)

( * ) Notice: Subject to any disclaimer, the term of this patent is extended or adjusted under 35 U.S.C. 154(b) by 155 days.

(21) Appl. No.: 17/415,121

(22) PCT Filed: Dec. 20, 2019

(86) PCT No.: PCT/IB2019/061229
§ 371 (c)(1),
(2) Date: Jun. 17, 2021

(87) PCT Pub. No.: WO2020/129026
PCT Pub. Date: Jun. 25, 2020

(65) Prior Publication Data
US 2022/0048005 A1    Feb. 17, 2022

(30) Foreign Application Priority Data
Dec. 21, 2018 (BE) .................................. 2018/5932

(51) Int. Cl.
*B01J 19/00* (2006.01)
*B01D 15/22* (2006.01)

(52) U.S. Cl.
CPC .......... *B01J 19/0093* (2013.01); *B01D 15/22* (2013.01); *B01J 2219/00916* (2013.01); *B01J 2219/2408* (2013.01); *B01J 2219/2448* (2013.01)

(58) Field of Classification Search
CPC ........ B01D 15/00; B01D 15/08; B01D 15/10; B01D 15/22; B01J 19/00; B01J 19/0093;
(Continued)

(56) References Cited

U.S. PATENT DOCUMENTS

2003/0226806 A1   12/2003   Young et al.
2004/0028580 A1   2/2004    Futami et al.
(Continued)

FOREIGN PATENT DOCUMENTS

EP   2541245 A1   1/2013
EP   2618149 A1   7/2013

OTHER PUBLICATIONS

Callewaert et al., Integration of uniform porous shell layers in very long pillar array columns using electrochemical anodization for liquid chromatography, Analyst, 2014, 139, 618-625 (Year: 2014).*
(Continued)

*Primary Examiner* — Natasha E Young

(57) ABSTRACT

A chemical reactor is implemented on a substrate. The chemical reactor has multiple ducts for transporting a fluid and/or gas during use of the chemical reactor, in which the ducts optionally include pillar structures and at least one connection duct connected between two of the multiple ducts for transporting the fluid and/or gas from one duct to another. In the connection duct, a series of individual pillar structures are positioned behind each other in the longitudinal direction of the connection duct.

15 Claims, 4 Drawing Sheets

(58) Field of Classification Search
CPC .......... B01J 2219/00; B01J 2219/00781; B01J 2219/00819; B01J 2219/00849; B01J 2219/00851; B01J 2219/00858; B01J 2219/0086; B01J 2219/00905; B01J 2219/00916; B01J 2219/24–2403; B01J 2219/2408; B01J 2219/2441; B01J 2219/2448; B01J 2219/245; B01J 2219/2469; B01J 2219/2471; B01J 2219/2472; B01J 2219/2474; B01J 2219/2475; G01N 30/00; G01N 30/02; G01N 30/60; G01N 30/6004; G01N 30/6017; G01N 30/6095

See application file for complete search history.

(56) References Cited

U.S. PATENT DOCUMENTS

| | | |
|---|---|---|
| 2007/0160474 A1 | 7/2007 | Iida |
| 2009/0286300 A1 | 11/2009 | Le Vot et al. |
| 2012/0125842 A1 | 5/2012 | Berthier et al. |

OTHER PUBLICATIONS

Aoyama et al., Use of Folded Micromachined Pillar Array Column with Low-Dispersion Turns for Pressure-Driven Liquid Chromatography, Jan. 21, 2010, American Chemical Society, 82, 1420-1426 (Year: 2010).*

De Malsche et al., Realization of 1 x 10 sup 6 Theoretical Plates in Liquid Chromatography Using Very Long Pillar Array Columns, 2012, 84, 1214-1219 (Year: 2012).*

International Search Report and Written Opinion from PCT Application No. PCT/IB2019/061229, dated Apr. 7, 2020.

Belgian Search Report from corresponding BE Application No. BE201805932, dated Sep. 19, 2019.

Isokawa et al., "Liquid Chromatography Chip with Low-Dispersion and Low Pressure-Drop Turn Structure Utilizing a Distribution-Controlled Pillar Array," Analytical Chemistry, vol. 88, No. 12, Jun. 8, 2016, pp. 6485-6491.

* cited by examiner

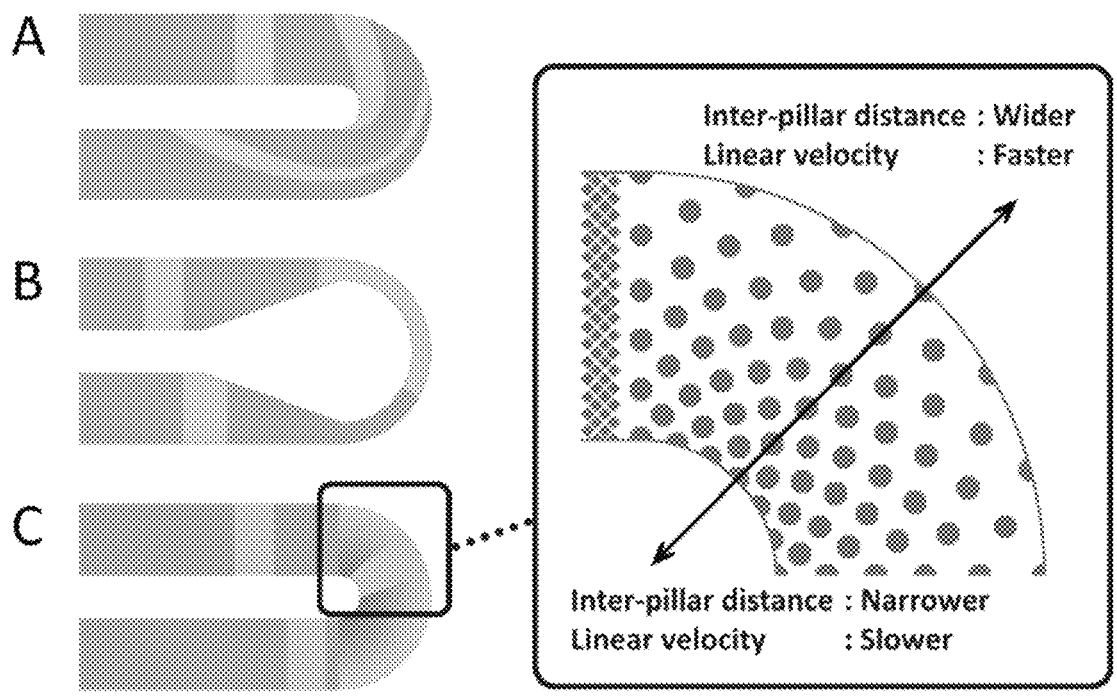
FIG. 1a – State of the art
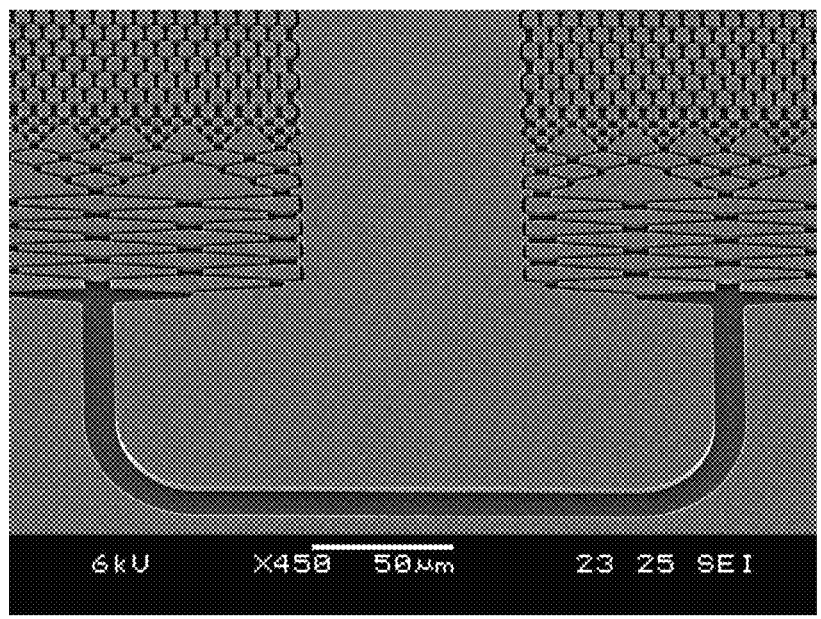
FIG. 1b – State of the art

CHEMICAL REACTORS

CROSS REFERENCE TO RELATED APPLICATIONS

This application is a national stage application claiming priority to and the benefit of PCT/IB2019/061229, now WO2020/129026, filed on Dec. 20, 2019, which claims priority to and the benefit of Belgium Patent Application Serial No. BE2018/5932, filed on Dec. 21, 2018.

SCOPE OF THE INVENTION

This invention generally relates to chemical reactors such as chromatographic systems for example. More specifically, the present invention relates to chemical reactors having multiple ducts interconnected in series.

BACKGROUND OF THE INVENTION

Systems that make use of liquid propagation have a large number of applications, including production of chemical components, synthesis of nanoparticles, separation and/or extraction of components, etc. A specific example of a separation technique for separating mixtures, for example for being able to accurately analyse them, is chromatography. There is a variation in forms of chromatography such as gas chromatography, gel chromatography, thin-coating chromatography, adsorption chromatography, affinity chromatography, liquid chromatography, etc. Liquid chromatography is typically used in pharmacy and chemistry, for both analytical and production applications. In liquid chromatography, use is made of the difference in solubility of various substances having a mobile phase and a stationary phase. As each substance has its own "bonding power" to the stationary phase, they are moved along faster or slower with the mobile phase and as such, certain substances can be separated from other ones. In principle, it is applicable to any connection, having the advantage that no evaporation of the material is required and that variations in temperature only have a negligible effect.

A typical example of liquid chromatography is based on chromatographic columns on the basis of multiple ducts interconnected in series. By interconnecting various ducts in series, an adequate length can be generated so that an adequate separation of the phases can be achieved for practical applications.

In order to generate efficient separation, Isokawa et al. describe in Analytical Chemistry 2016, vol. 88, p. 6485-6491, a column having ducts and bends whereby the bends show a low dispersion and low pressure drop characteristic. Hereby, the bends are provided with pillar structures as indicated in FIG. 1a whereby these specific features are created by the distribution of the pillar structures in function of the width and by the curvature of the bends. However, this results in a complex positioning and distribution of pillar structures.

Alternatively, no pillar structures are placed in the bends, as can be seen in FIG. 1b.

SUMMARY OF THE INVENTION

It is an objective of embodiments according to the present invention to produce efficient systems for separating materials.

The preceding objective may be achieved by a device according to embodiments of the present invention.

The present invention relates to a chemical reactor implemented on a substrate, the chemical reactor comprising multiple ducts for transporting a fluid and/or gas during use of the chemical reactor, in which the ducts optionally comprise pillar structures, and at least one connection duct connected between two of the multiple ducts for transporting the fluid and/or gas from one duct to another, in which, in the connection duct, a series of individual pillar structures are positioned behind each other in the longitudinal direction of the connection duct.

It is an advantage of embodiments according to the present invention that by placing pillar structures in the connection duct, the pressure resistance of the connection duct is not the restricting factor that determines the total pressure resistance of the chemical reactor. It is an advantage of embodiments of the present invention that the use of pillars allows the connection duct to be supported so that the chance of the duct breaking, by pressure for example, is small.

It is an advantage of embodiments according to the present invention that placing pillar structures in the connection duct improves the pressure distribution in the connection duct and, as a result, in the entire reactor. It is an advantage of embodiments according to the present invention that, during the production of the reactor, less or no waste is generated which may cause faults in the connection ducts during operation afterwards. It is an advantage of embodiments of the present invention that the pressure drop across the connection duct is restricted.

For each transverse section of the connection duct, at most one full pillar structure occurs. For example, alternatively or additionally, one or two partial pillar structures may occur which are positioned against the wall. A transverse section is a section that is transverse to the average direction of propagation of a fluid in the connection duct.

The connection duct may be connected between two of the multiple ducts such that the first duct, the connection duct and the second duct are downstream behind each other.

The connection duct may be connected such that, in use, an identical flow rate flows through the first duct, the connection duct and the second duct.

The connection duct may show a widening in positions where a pillar structure occurs. In some embodiments, the walls of the connection duct are not straight walls but follow the curvature of the pillar structures locally at the level of the pillar structures. The walls may show a sort of meandering shape. In places where no pillar structure is positioned, the connection duct is narrower.

In various transverse sections in the connection duct, the surface of free passage for fluid may vary less than 30%, preferably less than 20%, yet more preferably less than 10%.

The pillar structures may have a diameter which is at least 20%, preferably at least 40% of the average width of the connection duct.

The distance between two neighbouring pillars in the series of full pillar structures positioned in the longitudinal direction of the connection duct may be between 1 and 10 times the average diameter of the pillar structures, for example between 1 and 5 times the average diameter of the pillar structures.

The pillar structures in the connection duct may have a cylindrical shape.

The cylindrical shape has a ground surface that coincides with the base of the connection duct. However, the pillar structures in the connection duct may also have another shape, such as a non-rotational symmetrical shape. Alternatively, the pillar structures may have a rounded hexagonal shape in which the longitudinal axis of the pillars is oriented with the longitudinal axis in the direction of flow.

The connection duct may show a bend.

The multiple ducts may comprise a plurality of substantially parallel ducts, and the substantially parallel ducts may be connected to connection ducts which form a U bend each time.

The chemical reactor may comprise a chromatographic column.

The chemical reactor may be a chromatography system.

The chromatography system may be a high-performance fluid chromatography system.

In another aspect, the present invention also relates to a design for a chemical reactor as described above.

Specific and preferable aspects of the invention have been included in the attached independent and dependent claims. Features of the dependent claims may be combined with features of the independent claims and with features of other dependent claims such as indicated and not only as expressly brought forward in the claims.

SHORT DESCRIPTION OF THE FIGURES

FIGS. 1a and 1b illustrate a part of a chemical reactor whereby ducts are connected to a bend which comprises a plurality of pillar structures (FIG. 1a) or without pillar structures (FIG. 1b), as known from the state of the art.

Figure 2:
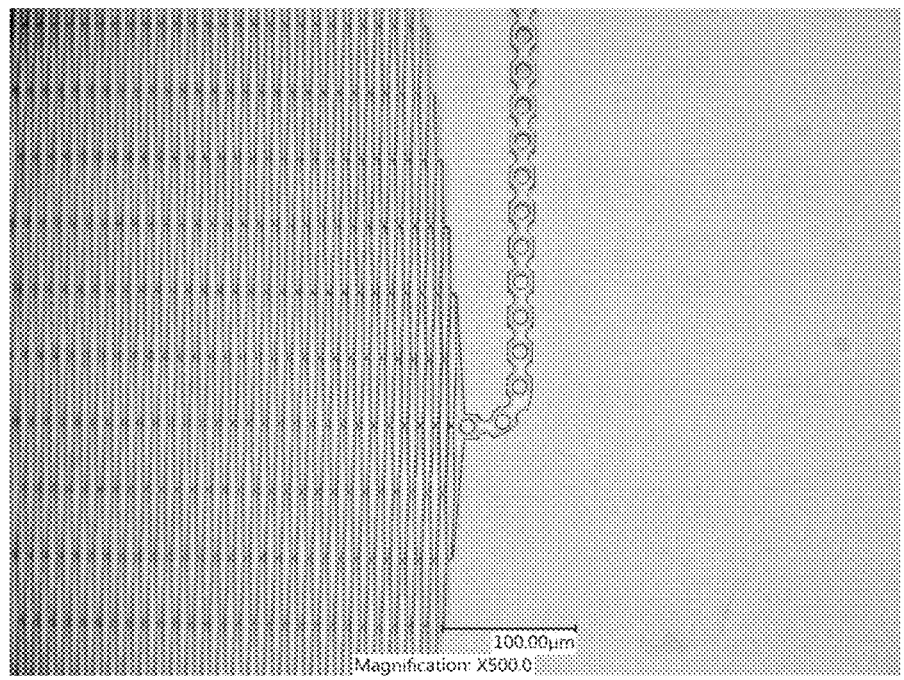
FIG. 2 illustrates a microscopic photo of a part of a duct and a part of a bend with pillar structures according to embodiments of the present invention.

The figures are only schematic and not restrictive. It is possible that, for illustrative purposes, the dimensions of some components are exaggerated and not represented to scale in the figures. The dimensions and relative dimensions do not necessarily correspond with the ones from practical embodiments of the invention. Reference numbers used in the claims may not be interpreted to restrict the scope of protection.

DETAILED DESCRIPTION OF ILLUSTRATIVE EMBODIMENTS

The present invention will be described referring to specific embodiments and to certain figures, but the invention is not restricted by them and is only restricted by the claims.

It should be noted that the terms "contain" and "comprise", as used in the claims, should not be interpreted as being restricted to the items described thereafter; these terms do not exclude any other elements or steps. They may be interpreted as specifying the presence of the features, values, steps or components indicated which are referred to, but do not exclude the presence or addition of one or several other features, values, steps or components, or groups thereof. Therefore, the extent of the expression "a device containing items A and B" should not be restricted to devices consisting of components A and B only. It means that in respect of the present invention, A and B are the only relevant components of the device.

References throughout this specification to "one embodiment" or "an embodiment" mean that a specific feature, structure or characteristic described in connection with the embodiment has been included in at least one embodiment of the present invention. Therefore, occurrences of the expressions "in one embodiment" or "in an embodiment" in various locations throughout this specification do not necessarily all need to refer to the same embodiment but may do so. Furthermore, the specific features, structures or characteristics may be combined in any suitable manner, as would be clear to a person skilled in the art on the basis of this publication, in one or several embodiments.

Similarly, it should be appreciated that in the description of sample embodiments of the invention, various features of the invention are sometimes grouped together in one single embodiment, figure or description thereof intended to streamline the publication and to help the understanding of one or several of the various inventive aspects. This method of publication should therefore not be interpreted as a reflection of an intention that the invention requires more features than explicitly mentioned in each claim. Rather, as the following claims reflect, inventive aspects lie in fewer than all features of one single previously publicised embodiment. Therefore, the claims following on from the detailed description have been explicitly included in this detailed description, with every independent claim being a separate embodiment of this invention.

Furthermore, while some embodiments described herein contain some, but not other, features included in other embodiments, combinations of features from various embodiments are intended to be within the scope of the invention, and they form various embodiments as would be understood by the person skilled in the art. For example, in the following claims, any of the embodiments described may be used in any combination.

Where reference is made, in embodiments of the present invention, to a section in which at most one full pillar structure is visible, reference is made to the situation in which the section comprises at most one pillar which is in the duct and which does not touch the side walls of the duct.

Where reference is made, in embodiments of the present invention, to various transverse sections, reference is made to various transverse sections perpendicular to the average direction of flow, positioned in various positions along the average direction of flow of the connection duct.

Where reference is made, in embodiments of the present invention, to a surface of free passage for fluid in various transverse sections perpendicular to the average direction of flow in the connection duct that varies less than X %, reference is made to a situation whereby the largest surface of free passage which can be retraced across all transverse sections perpendicular to the average direction of flow in the connection duct is not larger than 100%+X % than the smallest surface of free passage that can be retraced across all transverse sections perpendicular to the average direction of flow in the connection duct.

Where reference is made, in embodiments of the present invention, to the term widening of the connection duct, reference is made to the distance between the side walls of the connection duct in the direction perpendicular to the average direction of flow in the connection duct.

Where reference is made, in embodiments of the present invention, to the term average width of the connection duct, reference is made to the width of the duct measured in the direction perpendicular to the average direction of flow in the connection duct.

In a first aspect, the present invention relates to a chemical reactor. Such a chemical reactor may be a chromatographic column but is not restricted to this. Other examples of chemical reactors which may derive advantage from the present inventions may for example be enrichment filters or trapping columns, reactors with (micro) catalysts, multiphase reactors, fuel cells, electrochemical reactors, reactors for capillary electrochromatography, etc. The present invention relates to a chemical reactor implemented on a substrate.

The chemical reactor comprises multiple ducts for transporting a fluid and/or gas during use of the chemical reactor, in which the ducts optionally comprise pillar structures. Such ducts are often micro-fluid ducts. These ducts are typically interconnected in series in order to obtain a sufficiently long column for accurately separating substances. The chemical reactor also comprises at least one connection duct connected between two of the multiple ducts for transporting the fluid and/or gas from one duct to another. Therefore, such a connection duct typically creates the bends in the design and may for example have a U shape. Pillar structures are provided in the connection duct. They are positioned as a series of individual pillar structures behind each other in the longitudinal direction of the connection duct. The pillar structures are therefore placed in a row so that for each transverse section of the connection duct, at most one full pillar structure occurs. Partial pillar structures may be placed against the wall so that the inner wall of the ducts is not a straight wall but shows bends. The wall may for example be adjusted so that the surface of free passage for fluid in various transverse sections in the connection duct varies less than 30%, preferably less than 20%, yet more preferably less than 10%. Hereby, the connection duct is typically wider in positions where pillar structures occur.

The pillar structures that are in the connection ducts typically have a diameter which is at least 20%, preferably at least 40% of the average width of the connection duct. The distance between two neighbouring pillars in the series of individual pillar structures in the connection duct may be between 1 and 10 times the average diameter of the pillar structures in embodiments, for example between 1 and 5 times the average diameter of the pillar structures.

The shape of the pillar structures in the connection duct may be cylindrical, although embodiments are not restricted by this. For example, pillars with a hexagonal, polygonal, elliptic, oval, etc. section may be used or even pillars with a more irregular shape.

The width of the connection ducts is typically smaller than the width of the ducts in order to keep dispersion in the connection ducts to a minimum. The ratio of the width of the connection ducts in relation to the width of the ducts is typically between 1 and 1/100. The present invention is also advantageous the wider the connection ducts are, because the pillars may provide an additional strength.

The chemical reaction typically also has an inlet connected to one of the multiple effective ducts for the fluid/gas to enter into the ducts, and an outlet connected to one of the multiple effective ducts for at least one component of the fluid/gas to be discharged from the ducts.

The materials from which the reactor is made may correspond with materials as known from the state of the art. Typically, materials are used which may be anodised.

The features of the ducts and possible pillars may correspond with these as known from the state of the art. The ducts may for example have a width between 50 µm and 250 mm, for example between 50 µm and 100 mm, for example between 50 µm and 100 mm, for example between 50 µm and 20 mm. The ducts may have a depth between 2 µm and 1 mm, for example between 2 µm and the typical wafer thickness of a silicon disk. The pillars in the ducts may have a typical dimension between 100 nm and 3 mm, for example between 100 nm and 100 µm.

As an illustration, FIG. 2 shows a microscopic photo of a part of a duct and a connection duct according to an example of an embodiment of the present invention.

Figure 3A:
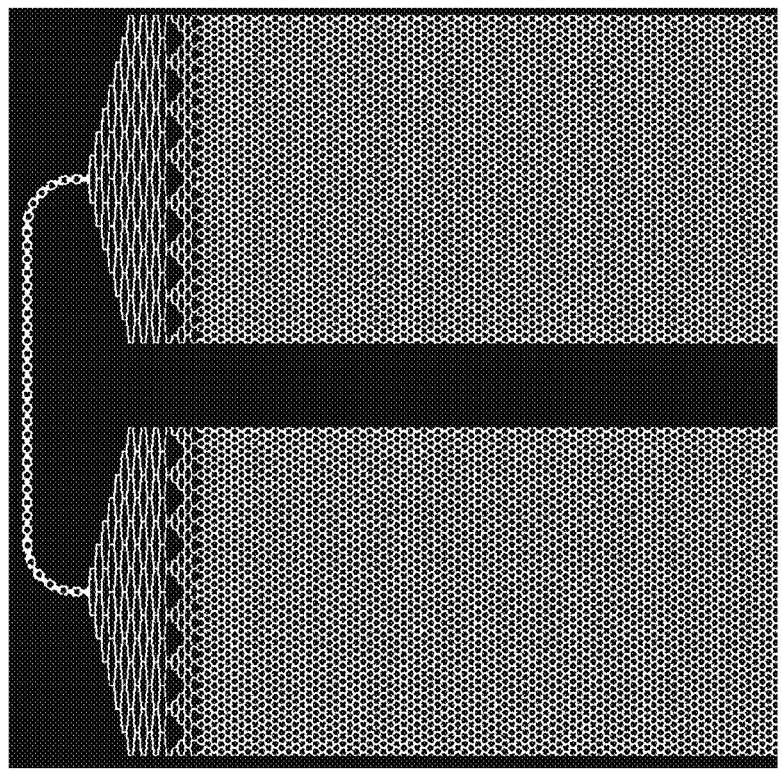
FIGS. 3A, 3B and 3C illustrate detail photos of components of a chemical reaction according to embodiments of the present invention.
Figure 3B:
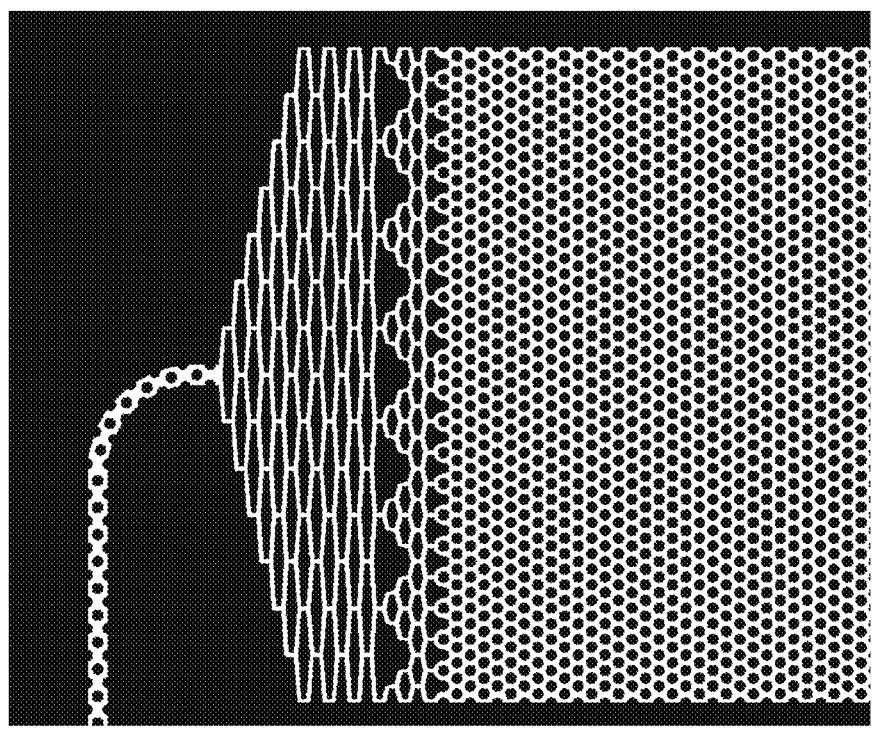
Figure 3C:
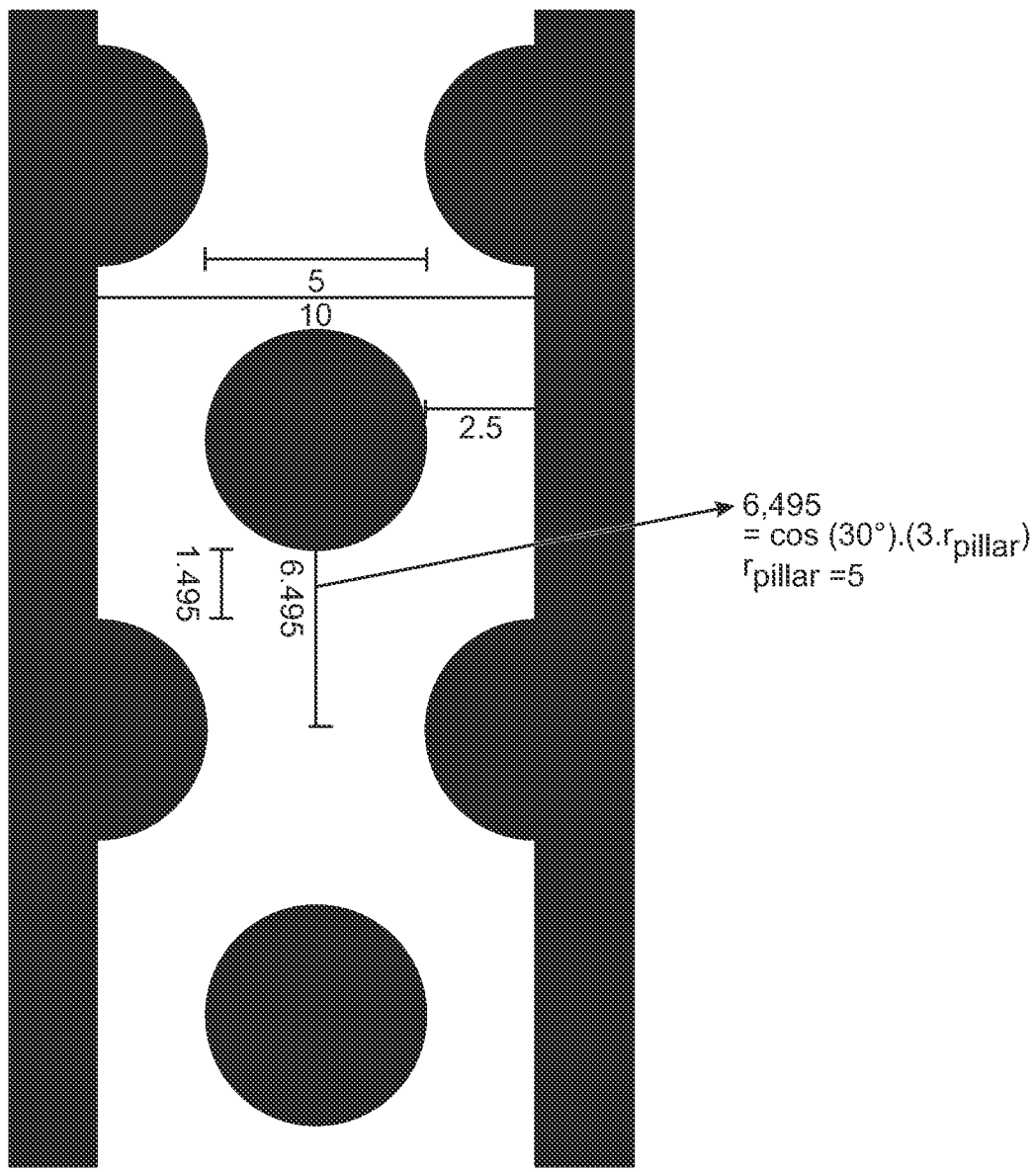

FIG. 3A shows a first example of a part of a design for a chemical reactor, whereby a plurality of parallel effective ducts are provided which comprise pillar structures and which are interconnected via connection ducts. In FIG. 3B, a part of the ducts and the bend are shown in more detail and FIG. 3C shows a detail of micropillars in the connection duct for a specific example, by which embodiments are not restricted. It will be clear to the person skilled in the art that this example is shown as an illustration only and that the specific dimensions indicated in the figure are illustrative only and not restrictive.

The invention claimed is:

1. A chemical reactor implemented on a substrate, the chemical reactor comprising:
   multiple ducts for transporting a fluid and/or gas during use of the chemical reactor; and
   at least one connection duct connected between two of the multiple ducts for transporting the fluid and/or gas from one duct to another,
   wherein, in the connection duct, a series of individual pillar structures are positioned behind each other in a longitudinal direction of the connection duct so that for each transverse section perpendicular to an average direction of flow in the connection duct, at most one full pillar structure occurs.

2. The chemical reactor according to claim 1, in which the connection duct bends and as such makes a connection between two of the multiple ducts.

3. The chemical reactor according to claim 1, in which the connection duct shows a widening in positions where a pillar structure of the series of individual pillar structures occurs.

4. The chemical reactor according to claim 1, in which, in various transverse sections perpendicular to the average direction of flow in the connection duct, a surface of free passage for fluid varies less than 30%.

5. The chemical reactor according to claim 1, in which the individual pillar structures of the series have a diameter which is at least 20% of an average width of the connection duct.

6. The chemical reactor according to claim 1, in which a distance between two neighbouring pillars of the series of individual pillar structures in the connection duct is between 1 and 10 times an average diameter of the individual pillar structures of the series.

7. The chemical reactor according to claim 1, in which the individual pillar structures of the series in the connection duct have a cylindrical shape.

8. The chemical reactor according to claim 1, in which the connection duct shows a bend.

9. The chemical reactor according to claim 1, in which the multiple ducts comprise a plurality of substantially parallel ducts, and in which the substantially parallel ducts are connected to connection ducts which form a U bend each time.

10. The chemical reactor according to claim 1, in which the chemical reactor comprises a chromatographic column.

11. The chemical reactor according to claim 1, in which the chemical reactor is a chromatography system.

12. The chemical reactor according to claim 11, in which the chromatography system is a high-performance fluid chromatography system.

13. The chemical reactor according to claim 1, in which the connection duct is connected between two of the multiple ducts such that a first duct of the two of the multiple ducts, the connection duct and a second duct of the two of the multiple ducts are downstream behind each other.

14. The chemical reactor according to claim 1, in which the connection duct is connected between two of the multiple ducts such that, when in use, an identical flow rate flows through a first duct of the two of the multiple ducts, the connection duct and a second duct of the two of the multiple ducts.

15. The chemical reactor according to claim 1, wherein the multiple ducts for transporting the fluid and/or gas during use of the chemical reactor comprise pillar structures.

\* \* \* \* \*